US010305080B2

(12) United States Patent
Yamada et al.

(10) Patent No.: US 10,305,080 B2
(45) Date of Patent: May 28, 2019

(54) MULTILAYER POROUS FILM, SEPARATOR FOR NON-AQUEOUS ELECTROLYTE SECONDARY BATTERY, NON-AQUEOUS ELECTROLYTE SECONDARY BATTERY, SLURRY, AND COATING LIQUID

(71) Applicant: MITSUBISHI PLASTICS, INC., Chiyoda-ku (JP)

(72) Inventors: Hiroto Yamada, Ogaki (JP); Kouji Takegawa, Nagahama (JP); Tomoyuki Nemoto, Nagahama (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 848 days.

(21) Appl. No.: 14/817,785

(22) Filed: Aug. 4, 2015

(65) Prior Publication Data
US 2016/0043371 A1    Feb. 11, 2016

(30) Foreign Application Priority Data

Aug. 5, 2014    (JP) ................................. 2014-159500

(51) Int. Cl.
*H01M 2/16*    (2006.01)
(52) U.S. Cl.
CPC ......... *H01M 2/166* (2013.01); *H01M 2/1646* (2013.01); *H01M 2/1653* (2013.01); *H01M 2/1686* (2013.01)
(58) Field of Classification Search
None
See application file for complete search history.

(56) References Cited

U.S. PATENT DOCUMENTS

| 2005/0019557 | A1 | 1/2005 | Kajihara et al. | |
| 2007/0281206 | A1* | 12/2007 | Fujikawa | H01M 2/145 429/62 |
| 2008/0149986 | A1 | 6/2008 | Ogle, Jr. et al. | |
| 2009/0246614 | A1* | 10/2009 | Kim | H01M 2/145 429/145 |
| 2012/0023199 | A1 | 1/2012 | Holden et al. | |

(Continued)

FOREIGN PATENT DOCUMENTS

| JP | 2005-44402 | 2/2005 |
| JP | WO 2013/073362 A1 | 5/2013 |
| JP | WO 2014/002701 A1 | 1/2014 |

OTHER PUBLICATIONS

U.S. Appl. No. 14/768,573, filed Aug. 18, 2015, Yamada, et al.
Office Action dated Jul. 5, 2016 in Japanese Patent Application No. 2015-153511.

*Primary Examiner* — Scott J. Chmielecki
(74) *Attorney, Agent, or Firm* — Oblon, McClelland, Maier & Neustadt, L.L.P.

(57) ABSTRACT

The viscosity stability in forming a slurry of one or metal components selected from water-insoluble metal oxides and metal salts is improved, and using the resultant slurry, a coating layer is formed on a polyolefinic resin porous film to give a multilayer porous film having excellent surface smoothness. The multilayer porous film has, as layered on at least one surface of a polyolefinic resin porous film, a coating layer that contains one or more metal components selected from water-insoluble metal oxides and metal salts, and a resin binder, wherein the content of water-soluble calcium contained in the metal components is 3 ppm by mass or less.

7 Claims, 1 Drawing Sheet

(56) References Cited

U.S. PATENT DOCUMENTS

2014/0234538 A1 8/2014 Yamada et al.
2014/0302389 A1 10/2014 Hasegawa et al.
2015/0111109 A1 4/2015 Yamada et al.

* cited by examiner

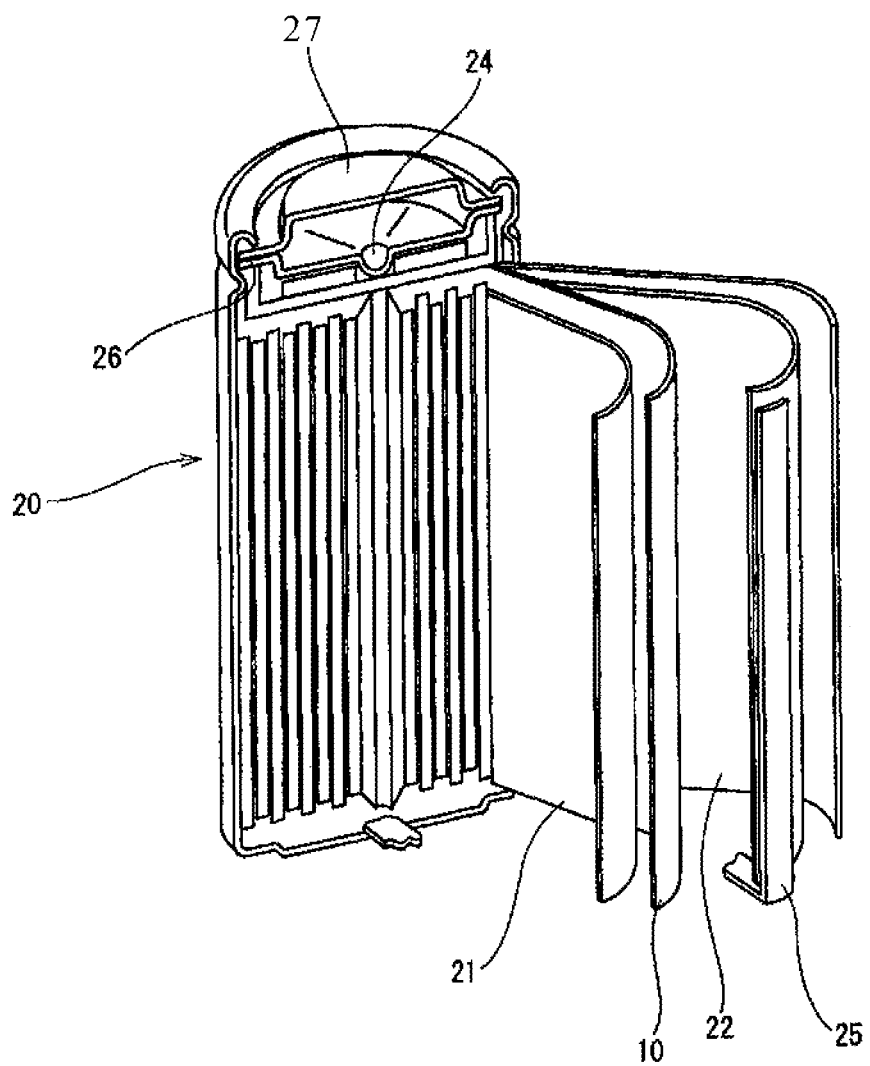

MULTILAYER POROUS FILM, SEPARATOR FOR NON-AQUEOUS ELECTROLYTE SECONDARY BATTERY, NON-AQUEOUS ELECTROLYTE SECONDARY BATTERY, SLURRY, AND COATING LIQUID

FIELD OF THE INVENTION

The present invention relates to a multilayer porous film usable in packaging, sanitary, animal husbandry, agricultural, architectural and medical applications, separator membranes, light diffusing plates and battery separators, especially favorable usable as separators for nonaqueous electrolyte secondary batteries, and relates to a separator for nonaqueous electrolyte secondary batteries using the multilayer porous film, a nonaqueous electrolyte secondary battery, a slurry and a coating liquid.

BACKGROUND OF THE INVENTION

Porous polymer bodies having many open micropores are used in various fields as separator membranes for use in ultrapure water production, purification of chemical solutions, water treatment, etc.; waterproof moisture-permeable films for use in clothing, sanitary supplies, etc.; and battery separators for use in secondary batteries, etc.

Secondary batteries are widely used as power supplies for portable instruments, such as OA, FA, electric appliances for home use, communication appliances, etc. In particular, portable instruments using lithium ion secondary batteries are becoming widespread because, when mounted on such instruments, the lithium ion secondary batteries have high volumetric efficiency and therefore can reduce the size and the weight of the instruments.

On the other hand, large-size secondary batteries are under research and development in many fields related to energy and environmental issues, including load-leveling, UPSs and electric vehicles. Among these, lithium ion secondary batteries that belong to one type of nonaqueous electrolyte secondary batteries are becoming used in various applications for the reasons that the batteries are excellent in large capacity, high output power, high voltage and long-term storage stability.

Lithium ion secondary batteries are generally so designed as to have a highest working voltage falling in a range of from 4.1 to 4.2 V. Aqueous solutions are electrolyzed at such a high voltage and could not be used as electrolyte solutions. Consequently, so-called nonaqueous electrolytes, which contain organic solvents, are used as electrolyte solutions that can withstand high voltages. High-permittivity organic solvents, which can dissolve a larger amount of lithium ions, are used as solvents for nonaqueous electrolytes. Organic carbonate compounds, such as propylene carbonate, ethylene carbonate, etc., are mainly used as high-permittivity organic solvents. A highly-reactive electrolyte such as lithium hexafluorophosphate or the like is dissolved in a solvent and is used as a supporting electrolyte to serve as a lithium ion source in the solvent.

A lithium ion secondary battery comprises a separator arranged between a positive electrode and a negative electrode in order to prevent internal short-circuits. From the nature of the system, the separator is naturally required to have insulating properties. In addition, the separator must have a microporous structure in order to achieve high permeability for passage of lithium ions therethrough and to diffuse and retain an electrolyte solution therein. To satisfy these requirements, porous films are used for separators.

The recent tendency toward a rise in battery capacity has resulted in the increase in the importance in battery safety. The characteristics of battery separators that contribute to safety include shutdown characteristics (hereinafter referred to as "SD characteristics"). The SD characteristics have such a function that micropores are closed at a high temperature in a range of approximately from 100° C. to 150° C. to thereby intercept ionic conduction in a battery and prevent a subsequent temperature rise in the battery. The lowest temperature at which micropores of a porous film are closed is referred to as a shutdown temperature (hereinafter referred to as "SD temperature"). Porous films to be used as battery separators need to have the SD characteristics.

However, because of recent increases in energy density and capacity of lithium ion secondary batteries, there have been accidents in which the ordinary shutdown characteristics could not sufficiently function so that the internal temperature of batteries may exceed over the melting point, approximately 130° C., of a polyethylene that is used as a material of already-existing separators, and as a result, this may cause thermal shrinkage and rupture of the separator and a short-circuit between electrodes. Given the situation and in order to ensure battery safety, there is a demand for separators having higher heat resistance than that for the present SD characteristics.

To satisfy the requirement, a multilayer porous film has been proposed that comprises, as arranged on at least one surface of a polyolefinic resin porous film, a coating layer formed of a porous layer that contains a metal oxide and a resin binder (PTLs 1 to 5). These documents say that, in these inventions, the proposed method is excellent in safety in that a coating film filled with a large amount of inorganic fine particles of α-alumina or the like is provided on a porous film and can therefore prevent short-circuits between electrodes even in an emergency of abnormal heating and continuous temperature increasing over the SD temperature.

CITATION LIST

Patent Literature

[PTL 1] JP-A 2004-227972
[PTL 2] JP-A 2008-186721
[PTL 3] WO2008/149986
[PTL 4] JP-A 2008-305783
[PTL 5] WO2012/023199

SUMMARY OF THE INVENTION

Technical Problem

However, in a case where particles of a water-insoluble metal oxide, a metal salt or the like are used in a coating layer, the particles often undergo surface state change depending on some delicate difference in the firing condition and the storage condition thereof, therefore providing a problem in that the viscosity of a slurry comprising the particles could not be stable and the productivity could not be stabilized. In a case where a multilayer porous film is produced using such a slurry that has an unstable viscosity, there occurs a phenomenon that the smoothness of the multilayer porous film is greatly worsened owing to the viscosity fluctuation of the slurry. Such a film still has other problems in that not only the outward appearance thereof is not good but also the conveyability, that is, the "slidability"

of the film is poor, and therefore in cutting the film into sheets or in piling up the resultant sheets, the handleability of the film is extremely bad.

An object of the present invention is to solve the above-mentioned problems. In other words, it is an object of the present invention to improve the viscosity stability in producing a slurry comprising one or more metal components selected from water-insoluble metal oxides and metal salts and to thereby provide a multilayer porous film having excellent surface smoothness in a case of forming a coating layer on a polyolefinic resin porous film using the resultant slurry.

Solution to Problem

The present inventors have assiduously studied taking the above-mentioned problems into consideration and, as a result, have found that, in a slurry comprising one or more metal components selected from water-insoluble metal oxides and metal salts, when the content of water-soluble calcium is controlled to be a specific amount, then the viscosity stability of the slurry can be improved and therefore a multilayer porous film having excellent surface smoothness can be obtained, and have completed the present invention.

Specifically, the present invention is as described below.

[1] A multilayer porous film having, as layered on at least one surface of a polyolefinic resin porous film, a coating layer that contains one or more metal components selected from water-insoluble metal oxides and metal salts, and a resin binder, wherein the content of water-soluble calcium contained in the metal components is 3 ppm by mass or less.

[2] A separator for nonaqueous electrolyte secondary batteries, using the multilayer porous film of the above [1].

[3] A nonaqueous electrolyte secondary battery using the separator for nonaqueous electrolyte secondary batteries of the above [2].

[4] A slurry comprising one or more metal components selected from water-insoluble metal oxides and metal salts, and a solvent, wherein the content of water-soluble calcium contained in the metal components is 3 ppm by mass or less, and wherein, as measured using a single cylindrical rotatory viscometer at a temperature of 23° C. and at a circumferential velocity of 100 rpm, the ratio of the viscosity thereof $\eta_{72}$ in 72 hours after the production to the viscosity thereof $\eta_1$ in 1 hour after the production, $\eta_{72}/\eta_1$, is less than 10.

[5] A coating liquid comprising the slurry of the above [4] and a resin binder.

Advantageous Effects of Invention

According to the present invention, the viscosity stability in producing a slurry that comprises one or more metal components selected from water-insoluble metal oxides and metal salts can be increased, and therefore in a case of forming a coating layer on a polyolefinic resin porous film using the resultant slurry, there can be obtained a multilayer porous film having excellent surface smoothness.

In addition, the multilayer porous film is also excellent in heat resistance and vapor permeability, and therefore can be favorably used as a separator for nonaqueous electrolyte secondary batteries.

BRIEF DESCRIPTION OF DRAWING

FIG. 1 is a schematic cross-sectional view of a battery that houses therein a multilayer porous film of the present invention.

DESCRIPTION OF EMBODIMENTS

Embodiments of the multilayer porous film, the separator for nonaqueous electrolyte secondary batteries, the nonaqueous electrolyte secondary battery, the slurry and the coating liquid of the present invention are described hereinunder.

Unless otherwise specifically indicated in the present invention, the expression "main component" allows inclusion of any other component within a range not interfering with the function of the main component, and though the content ratio of the main component is not particularly specified, the main component is meant to account for the largest content ratio, and is preferably contained in an amount of 50% by mass or more, more preferably 70% by mass or more, even more preferably 90% by mass or more (including 100% by mass) in the composition.

Also unless otherwise specifically indicated, the expression "from X to Y" (where X and Y each are an arbitrary number) includes a meaning of "X or more and Y or less" and also a meaning of "preferably more than X" and a meaning of "preferably less than Y".

[Multilayer Porous Film, Slurry, Coating Liquid]

The components constituting the multilayer porous film of the present invention, and the slurry and the coating liquid for use in producing the multilayer porous film are described below.

<Polyolefinic Resin Porous Film>

The polyolefinic resin to constitute the polyolefinic resin porous film includes a homopolymer or a copolymer produced through polymerization of ethylene and an α-olefin such as propylene, 1-butene, 4-methyl-1-pentene, 1-hexene, etc. Two or more different types of those homopolymers or copolymers may be used as combined. Of those, preferred is use of a polypropylenic resin or a polyethylenic resin. In particular, from the viewpoint of maintaining the mechanical strength and the heat resistance and the like of the multilayer porous film of the present invention, preferred is use of a polypropylenic resin.

(Polypropylenic Resin)

The polypropylenic resin for use in the present invention includes a homopolypropylene (propylene homopolymer) as well as a random copolymer or a block copolymer of propylene with ethylene and an α-olefin such as 1-butene, 1-pentene, 1-hexene, 1-heptene, 1-octene, 1-nonene, 1-decene or the like. Of those, more preferred for use herein is homopolypropylene from the viewpoint of maintaining the mechanical strength and the heat resistance and the like of the multilayer porous film of the present invention.

Of the polypropylenic resin, the isotactic pentad fraction (mmmm fraction) that indicates the stereoregularity thereof is preferably from 80 to 99%. More preferably, one having the fraction of from 83 to 98%, even more preferably from 85 to 97% can be used here. When the isotactic pentad fraction is not less than the above-mentioned lower limit, then the mechanical strength of the film can be improved. On the other hand, the upper limit of the isotactic pentad fraction is defined here as the upper limit that is industrially available at present, which, however, shall not apply to a case where any resin having a further higher regularity can be developed on the industrial level in future.

The isotactic pentad fraction (mmmm fraction) is meant to indicate the steric structure having a main chain of carbon-carbon bonds formed of arbitrary continuous five propylene units in which the five side chains of methyl groups are all positioned in the same direction with respect to the main chain, or the proportion of the structure.

The isotactic pentad fraction (mmmm fraction) may be calculated on the basis of the measured results in $^{13}$C-NMR, and signals in the methyl group region are assigned according to A. Zambelli et al. (Macromolecules 8, 687, (1975)).

The parameter $M_w/M_n$ of the polypropylenic resin for use herein that indicates the molecular weight distribution thereof is preferably from 2.0 to 10.0, more preferably from 2.0 to 8.0, even more preferably from 2.0 to 6.0. Having $M_w/M_n$ that falls within the range, the resin secures improved extrusion moldability and, in addition, in the case, the mechanical strength of the multilayer porous film is also improved.

$M_w/M_n$ of the polypropylenic resin may be measured according to a method of GPC (gel permeation chromatography).

The density of the polypropylenic resin is preferably from 0.890 to 0.970 g/cm$^3$, more preferably from 0.895 to 0.970 g/cm$^3$, even more preferably from 0.900 to 0.970 g/cm$^3$. The density of 0.890 g/cm$^3$ or more could secure suitable SD characteristics. On the other hand, the density of 0.970 g/cm$^3$ or less could also secure suitable SD characteristics and additionally could realize drawability of the film.

The density of the polypropylenic resin may be measured using a density gradient tube method according to JIS K7112 (1999).

Not specifically limited, the melt flow rate (MFR) of the polypropylenic resin is preferably from 0.5 to 15 g/10 min, more preferably from 1.0 to 10 g/10 min, even more preferably from 1.5 to 8.0 g/10 min, especially more preferably from 2.0 to 6.0 g/10 min. MFR of 0.5 g/10 min or more would make the resin have a high melt viscosity in molding and could secure sufficient productivity. On the other hand, MFR of 15 g/10 min or less could sufficiently secure the mechanical strength of the resultant multilayer porous film.

MFR of the polypropylenic resin may be measured under the condition of a temperature of 230° C. and a load of 2.16 kg according to JIS K7210 (1999).

The production method for the polypropylenic resin is not specifically limited, for which mentioned here are various known polymerization methods using known olefin polymerization catalysts, for example, a suspension polymerization method, a melt polymerization method, a bulk polymerization method or a vapor-phase polymerization method using a multi-site catalyst as typified by a Ziegler-Natta catalyst or using a single-site catalyst as typified by a metallocene catalyst, or a bulk polymerization method using a radical initiator.

Examples of the polypropylenic resin include commercially available products, such as trade names "Novatec PP" and "WINTEC" (both manufactured by Japan Polypropylene Corporation), "Notio" and "Tafmer XR" (both manufactured by Mitsui Chemicals, Inc.), "Zelas" and "Thermorun" (both manufactured by Mitsubishi Chemical Corp.), "Sumitomo Noblen" and "Tafthern" (both manufactured by Sumitomo Chemical Co., Ltd.), "Prime Polypro" and "Prime TPO" (both manufactured by Primer Polymer Co., Ltd.), "Adflex", "Adsyl" and "HMS-PP (PF814)" (all manufactured by SunAlomer Ltd.), "Versify" and "Inspire" (both manufactured by The Dow Chemical Company), etc.

(Polyethylenic Resin)

The polyethylenic resin usable in the present invention includes a low-density polyethylene, a linear low-density polyethylene, a linear ultra-low-density polyethylene, a middle-density polyethylene, a high-density polyethylene, and a copolymer comprising ethylene as a main component, etc.

The copolymer comprising ethylene as a main component includes a copolymer or a terpolymer of ethylene with one or more comonomers selected from unsaturated compounds such as an α-olefin having from 3 to 10 carbon atoms, such as propylene, 1-butene, 1-pentene, 1-hexene, 1-heptene, 1-octene, etc.; a vinyl ester such as vinyl acetate, vinyl propionate, etc.; an unsaturated carboxylate such as methyl acrylate, ethyl acrylate, methyl methacrylate, ethyl methacrylate, etc.; a conjugated diene; a nonconjugated diene; or the like, and also a mixed composition of those polymers. The ethylene unit content in the ethylenic polymer is generally more than 50% by mass.

Of those polyethylenic resins, preferred is at least one polyethylenic resin selected from a low-density polyethylene, a linear low-density polyethylene and a high-density polyethylene, and more preferred is a high-density polyethylene.

The density of the polyethylenic resin is preferably from 0.910 to 0.970 g/cm$^3$, more preferably from 0.930 to 0.970 g/cm$^3$, even more preferably from 0.940 to 0.970 g/cm$^3$. The density of 0.910 g/cm$^3$ or more could secure suitable SD characteristics. On the other hand, the density of 0.970 g/cm$^3$ or less could also secure suitable SD characteristics and additionally could realize drawability of the film.

The density of the polyethylenic resin may be measured using a density gradient tube method according to JIS K7112 (1999).

Not specifically limited, the melt flow rate (MFR) of the polyethylenic resin is preferably from 0.03 to 30 g/10 min, more preferably from 0.3 to 10 g/10 min. MFR of 0.03 g/10 min or more can make the resin have a sufficiently low melt viscosity in molding and therefore realizes excellent productivity. On the other hand, MFR of 30 g/10 min or less realizes sufficient mechanical strength.

MFR of the polyethylenic resin may be measured under the condition of a temperature of 190° C. and a load of 2.16 kg according to JIS K7210 (1999).

The production method for the polyethylenic resin is not specifically limited, for which mentioned here are various known polymerization methods using known olefin polymerization catalysts, for example, a polymerization method using a multi-site catalyst as typified by a Ziegler-Natta catalyst or using a single-site catalyst as typified by a metallocene catalyst. The polymerization method for the polyethylenic resin includes one step polymerization, two-step polymerization, multistep polymerization in more than two steps, etc., and polyethylenic resins according to any method are employable here.

(Other Components)

In the present invention, additives that are generally incorporated in resin compositions may be suitably added to the polyolefinic resin porous film, in addition to the above-mentioned resin added thereto, within a range not significantly detracting from the effects of the present invention. The additives are added for the purpose of improving and regulating the moldability, the productivity and various physical properties of the polyolefinic resin porous film, and include recycled resin from trimming loss of deckle edges, etc.; inorganic particles such as silica, talc, kaolin, calcium carbonate, etc.; pigment such as carbon black, etc.; and other additives such as flame retardant; weather stabilizer; heat stabilizer; antistatic agent; melt viscosity improver; crosslinking agent; lubricant; nucleating agent; plasticizer; anti-aging agent; antioxidant; light stabilizer; UV absorbent; neutralizing agent; defogger; antiblocking agent; slip agent; colorant; etc.

In addition, for promoting cell opening and for imparting moldability, various resins and low-molecular compounds such as wax or the like may also be added to the film within a range not significantly detracting from the effects of the present invention.

(Layer Configuration of Polyolefinic Resin Porous Film)

In the present invention, the polyolefinic resin porous film may be a single-layer one or a multilayer one, and is not specifically limited. For example, there are mentioned a single-layer film of the polyolefinic resin-containing layer (hereinafter this may be referred to as "layer P"), and a multilayer film that comprises the layer P and any other layer (hereinafter this may be referred to as "layer Q") within a range not interfering with the function of the layer P. For example, for use for a separator for nonaqueous electrolyte secondary batteries, a low-melting-point resin layer whose pores are closed in a high-temperature atmosphere for securing the safety of batteries, as in JP-A 04-181651, may be layered.

Concretely, there are exemplified a two-layer configuration of a laminate of layer P and layer Q, a three-layer configuration of a laminate of layer P, layer Q and layer P, or layer Q, layer P and layer Q, etc. In addition, the film may have a three-type three-layer configuration that comprises a combination with any other layer having any other function. In this case, the order of lamination with any other layer having any other function is not specifically limited. Further, the number of the layers may be increased in any desired manner to be 4 layers, 5 layers, 6 layers or 7 layers.

The physical properties of the polyolefinic resin porous film for use in the present invention may be freely controlled according to the layer configuration, the layering ratio, the composition of each layer and the production method.

(Production Method for Polyolefinic Resin Porous Film)

Next described is a production method for the polyolefinic resin porous film for use in the present invention, but the present invention is not limited to only the polyolefinic resin porous film produced according to the production method.

Concretely, using the polyolefinic resin mentioned above, a polyolefinic resin nonporous film (hereinafter this may be referred to as "nonporous film") is produced through melt extrusion, and the nonporous film is stretched to obtain a porous film having a large number of micropores which realize open cellular morphology in the thickness direction.

The production method for the nonporous film is not specifically limited, for which any known method is employable. For example, there is mentioned a method of melting a thermoplastic resin composition and extruding it out through a T-die using an extruder, and cooling and solidifying it on a cast roll. In addition, also employable here is a method of cutting open a nonporous tube prepared according to a tubular method to give a flat film.

The method for processing the nonporous film to be a porous film is not specifically limited, for which employable is any known method such as a monoaxial or more multi-axial stretching and pore-forming method on a wet-process, a monoaxial or more multiaxial stretching and pore-forming method on a dry-process, etc. For the stretching method, employable is any of a roll stretching method, a rolling method, a tenter stretching method, a simultaneous biaxial stretching method, etc. One alone or two or more of these methods may be combined for monoaxial or more multiaxial stretching. Above all, preferred is a sequential biaxial stretching method from the viewpoint of porous structure control.

If desired, also employable here is a method where the plasticizer contained in the polyolefinic resin composition before and after stretching is extracted using a solvent and then dried.

In the case of using a polypropylenic resin for the polyolefinic resin porous film, preferably, so-called β-crystals are formed in the nonporous film. Forming β-crystals in the nonporous film makes it easy to form micropores in the film merely by stretching even in a case where an additive such as a filler or the like is not used, and as a result, a polyolefinic resin porous film having excellent vapor permeability characteristics can be obtained.

The method for forming β-crystals in the nonporous film of a polypropylenic resin includes a method in which a substance to promote the formation of α-crystals of the polypropylenic resin is not added, a method of adding a polypropylene that has been processed to generate an peroxide radical as described in Japanese Patent No. 3739481, a method of adding a β-crystal nucleating agent to the composition, etc.

(β-Crystal Nucleating Agent)

The β-crystal nucleating agent includes those mentioned below. Not specifically limited, any one capable of enhancing the formation and growth of β-crystals of a polypropylenic resin is employable here, and two or more such agents may be used as combined.

The β-crystal nucleating agent includes, for example, amide compounds; tetroxaspiro compounds; quinacridones; nanoscale-size iron oxide; alkali or alkaline earth metal carboxylates as typified by potassium 1,2-hydroxystearate, magnesium benzoate, magnesium succinate, magnesium phthalate, etc.; aromatic sulfonic acid compounds as typified by sodium benzenesulfonate, sodium naphthalenesulfonate, etc.; di or triesters of di or tribasic carboxylates; phthalocyanine pigments as typified by phthalocyanine blue, etc.; two-component compounds comprising a component A of an organic dibasic acid and a component B of an oxide, hydroxide or a salt of a metal of Group 2 of the Periodic Table; compositions comprising a cyclic phosphorus compound and a magnesium compound, etc. Specific types of other nucleating agents are described in JP-A 2003-306585, JP-A 8-144122 and JP-A 9-194650.

Commercially-available β-crystal nucleating agents include a β-crystal nucleating agent "Njstar NU-100" manufactured by New Japan Chemical Co., Ltd. Specific examples of polypropylenic resins to which a β-crystal nucleating agent is added include a polypropylene "Bepol B-022SP" manufactured by Aristech Co, Ltd., a polypropylene "Beta(β)-PP BE60-7032" manufactured by Borealis Co., Ltd., a polypropylene "BNX BETAPP-LN" manufactured by Mayzo Co., Ltd., etc.

The proportion of the β-crystal nucleating agent to be added to the polypropylenic resin must be suitably controlled depending on the type of the β-crystal nucleating agent, the composition of polypropylenic resin or the like. Preferably, the proportion is from 0.0001 to 5 parts by mass relative to 100 parts by mass of the polypropylenic resin to constitute the polyolefinic resin porous film, more preferably from 0.001 to 3 parts by mass, even more preferably from 0.01 to 1 part by mass, still more preferably from 0.1 to 0.8 parts by mass.

When the proportion of the β-crystal nucleating agent is 0.0001 parts by mass or more relative to 100 parts by mass of the polypropylenic resin, it is possible to sufficiently form and grow β-crystals of the polypropylenic resin in production thereof, and in use as a separator for nonaqueous electrolyte secondary batteries, the resin film can secure sufficient β-crystal activity of the resin and can therefore realize the desired vapor permeability performance. On the other hand, the proportion of the β-crystal nucleating agent of being 5 parts by mass or less relative to 100 parts by mass of the polypropylenic resin is preferred since not only a balance between the production cost and the performance is excellent, but also bleeding of the β-crystal nucleating agent etc. would not be caused on the surface of the polyolefinic resin porous film.

In addition, in the present invention, in a case where the polyolefinic resin porous film is planned to have a two-layered structure of a layer P and a layer Q, or a three-layered structure of a layer P, layer Q and a layer P, or a four or more multi-layered structure, as described above, the production method may be roughly classified into the following three types depending on the sequence of pore formation and multilayer formation, etc.
 (i) A method comprising forming pores in each layer, and laminating or adhering the resultant porous layers using an adhesive or the like to give a multilayer film.
 (ii) A method comprising layering the constituent layers to give a multilayer nonporous film, and then forming pores in the nonporous film.
 (iii) A method comprising forming pores in any one of the constituent layers, layering the layer with another nonporous film, and then forming pores.

In the present invention, preferred is the method (ii) from the viewpoint of the simplified process and of the productivity of the film. In particular, for securing the interlayer adhesion between two layers, especially preferred is a method that comprises preparing a multilayer nonporous film through coextrusion and then forming pores in the film.

A preferred production method for the polyolefinic resin porous film is described hereinunder.

First prepared is a mixed resin composition comprising a polyolefinic resin and optional components of a thermoplastic resin and an additive. For example, source materials of a polypropylenic resin, a β-crystal nucleating agent and optionally any other additive are mixed, preferably using a Henschel mixer, a super mixer, a tumbler mixer or the like, or all the components are put into a bag and hand-blended, and then melt-kneaded using a single-screw or twin-screw extruder, a kneader or the like, preferably a twin-screw extruder, and cut into pellets.

The pellets are put into an extruder, and extruded out through the T-die extrusion nozzle to form a nonporous film. The type of the T-die is not specifically defined. For example, in a case where the polyolefinic resin porous film in the present invention has a two-type three-layer multilayer structure, the T-die may be a two-type three-layer multi-manifold type one, or may be a two-type three-layer feed-block type one.

The gap of the T-die to be used may be determined depending on the finally necessary thickness of the film, the stretching condition, the draft ratio and other various conditions, but in general, the gap may be from 0.1 to 3.0 mm or so, preferably from 0.5 to 1.0 mm. When the T-die has a gap of 0.1 mm or more, the production speed can be increased. When the gap is 3.0 mm or less, then the draft ratio could not be too high and therefore the production stability can be improved.

In extrusion molding, the extrusion processing temperature may be suitably controlled depending on the flow characteristics and the moldability of the mixed resin composition, and is preferably from 180 to 350° C., more preferably from 200 to 330° C., even more preferably from 220 to 300° C. When the temperature is 180° C. or higher, then the viscosity of the molten resin could be sufficiently low and the moldability thereof is excellent, and therefore productivity could be improved. On the other hand, when the temperature is 350° C. or lower, the resin composition can be prevented from degrading and accordingly the mechanical strength of the multilayer porous film to be produced could be prevented from lowering.

By controlling the cooling solidification temperature of the cast roll, the ratio of β-crystal in the polyolefinic resin in the nonporous film may also be controlled. The cooling solidification temperature is preferably from 80 to 150° C., more preferably from 90 to 140° C., even more preferably from 100 to 130° C. When the cooling solidification temperature is 80° C. or higher, the ratio of β-crystal in the nonporous film could be sufficiently increased. On the other hand, when the temperature is 150° C. or lower, it may be possible to prevent any trouble that the extruded. molten resin would adhere to and wind around the cast roll, and therefore it may be possible to efficiently produce the intended filmy product.

Next, the resultant nonporous film is stretched. In the stretching step, preferably, the film is stretched at least biaxially. The biaxial stretching may be simultaneous biaxial stretching or successive biaxial stretching, but preferred is successive biaxial stretching in which the stretching condition (draft ratio, temperature) can be selected in a simplified manner in each stretching step and a porous structure of the film can be readily controlled.

In this description, the lengthwise direction of the filmy product and the film is referred to as "longitudinal direction", and the direction vertical to the lengthwise direction is referred to as "lateral direction". The stretching in the lengthwise direction is referred to as "longitudinal stretching", and the stretching in the direction vertical to the lengthwise direction is referred to as "lateral stretching".

In the case of successive biaxial stretching, the stretching temperature may be suitably changed depending on the formulation, the crystal melting peak temperature and the crystallization degree of the resin composition to be used. Preferably, the stretching temperature in longitudinal-direction stretching is from 0 to 130° C., more preferably from 10 to 120° C., even more preferably from 20 to 110° C. The draft ratio in longitudinal stretching is preferably from 2 to 10 times, more preferably from 3 to 8 times, even more preferably from 4 to 7 times.

The longitudinal stretching in the above-mentioned range realizes expression of suitable pore originations while preventing breakage of the film.

On the other hand, the stretching temperature in lateral stretching is preferably from 100 to 170° C., more preferably from 110 to 160° C., even more preferably from 120 to 155° C. The draft ratio in lateral stretching is preferably from 1.2 to 10 times, more preferably from 1.5 to 8 times, even more preferably from 2 to 7 times.

The lateral stretching in the above-mentioned range can suitably expand the pore originations that have been formed in the previous longitudinal stretching and can therefore express a microporous structure.

The stretching rate in the stretching step is preferably from 500 to 12,000%/min, more preferably from 1,500 to 10,000%/min, even more preferably from 2,500 to 8,000%/min.

The polyolefinic resin porous film thus obtained is preferably heat-treated for the purpose of improving the dimensional stability. In this case, the heat treatment temperature is preferably 100° C. or higher, more preferably 120° C. or higher, even more preferably 140° C. or higher. When the heat treatment temperature is 100° C. or higher, then the dimensional stability could be improved. On the other hand, the heat treatment temperature is preferably 170° C. or lower, more preferably 165° C. or lower, even more preferably 160° C. or lower. When the heat treatment temperature is 170° C. or lower, then the polyolefinic resin would hardly melt during the heat treatment and the film can favorably maintain the porous structure thereof.

In this description, the heat treatment for improving the dimensional stability may be referred to as "heat fixation".

During the heat treatment step, if desired, the film may be subjected to 1 to 20% relaxation treatment. After the heat treatment, the film may be uniformly cooled and wound up to be a polyolefinic resin porous film.

For the purpose of improving the interlayer adhesion, the surface of the polyolefinic resin porous film is preferably subjected to surface treatment of corona treatment, plasma treatment, chemical oxidation treatment or the like. The surface treatment step may be after the extrusion molding step or may be after the longitudinal stretching step or may even be after the lateral stretching step, in the polyolefinic resin porous film production process. Above all, from the viewpoint of shortening the production line and of improving the productivity, the surface treatment is preferably performed after the lateral stretching step.

<Coating Layer>

The multilayer porous film of the present invention has, as layered on at least one surface of a polyolefinic resin porous film, a coating layer that contains one or more metal components selected from water-insoluble metal oxides and metal salts, and a resin binder. Here, "water-insoluble" means that the solubility of the substance in 100 g of water at 20° C. is generally 0.01 g or less, preferably 0.001 g or less.

Examples of one or more metal components selected from water-insoluble metal oxides and metal salts concretely include metal carbonates such as calcium carbonate, magnesium carbonate, barium carbonate, etc.; metal sulfates such as barium sulfate, etc.; metal oxides such as magnesium oxide, zinc oxide, alumina, silica, titanium oxide, etc.; metal chlorides such as silver chloride, etc.; clay minerals such as talc, clay, mica, montmorillonite, etc.; barium titanate, etc. One alone or two or more of these may be used here either singly or as combined.

Of those, preferred is alumina, barium sulfate or barium titanate, from the viewpoint that the component is chemically inert when the multilayer porous film of the present invention is incorporated in a battery as a battery separator. More preferred is alumina.

Alumina usable in the present invention includes α-alumina, γ-alumina, θ-alumina, κ-alumina, pseudo-boehmite, etc. Above all, preferred is α-alumina from the viewpoint that it is chemically inert when the film is used as a separator for nonaqueous electrolyte secondary batteries and the film is incorporated in a battery.

In the present invention, it is important that the content of water-soluble calcium contained in the one or more metal components selected from water-insoluble metal oxides and metal salts is 3 ppm by mass or less. Water-soluble calcium is a calcium element that exists in the form of a water-soluble compound thereof such as calcium chloride, calcium oxide, calcium hydroxide, calcium sulfate or the like in the one or more metal components selected from water-insoluble metal oxides and metal salts. "Water-soluble" means that the solubility of the component in 100 g of water at 20° C. is generally more than 0.01 g, more preferably more than 0.1 g.

The content of water-soluble calcium contained in the above-mentioned metal components is 3 ppm by mass or less, and this provides effects that the slurry can be prevented from coagulating and the viscosity thereof can be stabilized, though the technical justification thereof is not clear.

The content of water-soluble calcium contained in the metal components is more preferably 2.8 ppm by mass or less, even more preferably 2.6 ppm by mass or less, still more preferably 2.3 ppm by mass or less, especially preferably 2.0 ppm by mass or less.

On the other hand, the lower limit of the content is not specifically limited, and the content may be 0 ppm by mass. However, it is considered that, in an electrolyte for lithium ion secondary batteries, hydrogen fluoride generated due to chemically bound water or side reaction would deteriorate battery characteristics, but when a calcium ion derived from water-soluble calcium can exist in the electrolyte, it could react with hydrogen fluoride to give water-insoluble calcium fluoride, thereby preventing the battery characteristics from being deteriorated. Accordingly, the content of water-soluble calcium to be contained in the metal components is more preferably 0.1 ppm by mass or more, even more preferably 0.5 ppm by mass or more, still more preferably 1.0 ppm by mass or mores, especially preferably 1.4 ppm by mass or more.

The content of water-soluble calcium contained in the one or more metal components selected from water-insoluble metal oxides and metal salts can be measured according to the measurement method to be mentioned hereinunder.

In the present invention, it is desirable that the content of water-soluble calcium is measured by analyzing the formed coating layer, but the measured value of the content of water-soluble calcium contained in the metal components to be used in the coating liquid may be regarded as the content of water-soluble calcium contained in the metal components in the coating layer.

The lower limit of the mean particle size of the particles of the water-insoluble metal oxide or metal salt is preferably 0.01 μm or more, more preferably 0.1 μm or more, even more preferably 0.2 μm or more. On the other hand, the upper limit is preferably 3.0 μm or less, more preferably 1.5 μm or less. The mean particle size of 0.01 μm or more is preferred, since the multilayer porous film of the present invention can exhibit sufficient heat resistance. The mean particle size of 3.0 μm or less is preferred from the viewpoint that the dispersibility of the particles of the water-insoluble metal oxide or metal salt in the coating layer can be improved.

In this embodiment, "the mean particle size of particles of the water-insoluble metal oxide or metal salt" may be measured and calculated, using an image analyzer or a laser diffraction/scattering particle size distribution measuring apparatus, etc. For example, in a case where an image analyzer is used, the water-insoluble metal oxide or metal salt particles are projected in an arbitrary direction (referred to as the direction Z), and the minor diameter and the major diameter of the two-dimensional projected image are averaged, and also the water-insoluble metal oxide or metal salt particles are projected in an arbitrary direction vertical to the direction Z (referred to as the direction X), and the minor diameter and the major diameter of the two-dimensional projected image are averaged. The averaged values are averaged to be the mean particle size of the particles. The number of the water-insoluble metal oxide or metal salt particles to be analyzed for calculation may be 50 or more.

The specific surface area of the water-insoluble metal oxide or metal salt particles is preferably 5 m²/g or more and less than 30 m²/g. The specific surface area is more preferably from 5 m²/g to 20 m²/g, even more preferably from 5 m²/g to 10 m²/g.

The specific surface area of 5 m²/g or more is preferred because, when the multilayer porous film of the present invention is incorporated as a separator in a nonaqueous electrolyte secondary battery, the electrolytic solution can penetrate through the separator rapidly and therefore the battery productivity is bettered. The specific surface area of less than 30 m²/g is also preferred because, when the multilayer porous film of the present invention is incorporated as a separator in a nonaqueous electrolyte secondary battery, the components of the electrolytic solution can be prevented from being adsorbed by the separator.

In the present embodiment, "specific surface area of water-insoluble metal oxide or metal salt particles" is a value measured according to a constant-volume gas adsorption method.

In the coating layer, the content of the metal components relative to the total amount of the metal components and the resin binder to be mentioned below is preferably from 80% by mass to 99.9% by mass, more preferably 92% by mass or more, even more preferably 95% by mass or more, still more preferably 98% by mass or more. When the content of the metal components falls within the range, the coating layer can secure excellent vapor permeability and adhesiveness.

(Resin Binder)

Not specifically limited, the resin binder for use in the present invention may be any one that is effective for favorably bonding the metal components and the polyolefinic resin porous film and is electrochemically stable, and is stable to an organic electrolytic solution in a case where the multilayer porous film is used as a separator for nonaqueous electrolyte secondary batteries. Concretely, the resin binder includes polyethers, polyamides, polyimides, polyamideimides, polyaramids, polyoxyethylenes, ethylene-vinyl acetate copolymers (in which the vinyl acetate-derived structural unit is from 0 to 20 mol %), ethylene-acrylic acid copolymers such as ethylene-ethyl acrylate copolymers, etc., polyvinylidene fluorides, polyvinylidene fluoride-hexafluoropropylenes, polyvinylidene fluoride-trichloroethylenes, polytetrafluoroethylenes, fluororubbers, styrene-butadiene rubbers, nitrile-butadiene rubbers, polybutadiene rubbers, polyacrylonitriles, polyacrylic acids and derivatives thereof, polymethacrylic acids and derivatives thereof, carboxymethyl celluloses, hydroxyethyl celluloses, cyanoethyl celluloses, polyvinyl alcohols, cyanoethyl-polyvinyl alcohols, polyvinyl butyrals, polyvinyl pyrrolidones, poly-N-vinylacetamides, crosslinked acrylic resins, polyurethanes, epoxy resins, maleic acid-modified polyolefins, etc. One alone or two or more types of these resin binders may be used here either singly or as combined.

Of those resin binders, preferred are polyoxyethylenes, polyvinyl alcohols, polyvinylidene fluorides, polyvinyl pyrrolidones, polyacrylonitriles, styrene-butadiene rubbers, carboxymethyl celluloses, polyacrylic acid and derivatives thereof and maleic acid-modified polyolefins, since they are relatively stable in water.

(Acid Component)

Preferably, the coating liquid for use in forming the coating layer in the present invention contains an acid component. The acid component may remain as an acid itself in the coating layer in the multilayer porous film of the present invention, or may remain therein as a salt formed through reaction with an alkaline impurity in the coating layer. Adding an acid component is effective for improving the uniformity of the coating layer.

Preferably, the acid component has a first acid dissociation constant ($pK_{a1}$) in an aqueous diluent solution thereof at 25° C. of 5 or less, but does not have or has a second acid dissociation constant ($pK_{a2}$) of 7 or more. Examples of the acid component having such characteristics include lower primary carboxylic acids such as formic acid, acetic acid, propionic acid, acrylic acid, etc.; nitro acids such as nitric acid, nitrous acid, etc.; halogenoxo acids such as perchloric acid, hypochlorous acid, etc.; hydrohalogenic acid of hydrochloric acid, hydrofluoric acid, hydrobromic acid, etc.; phosphoric acid, salicylic acid, glycolic acid, lactic acid, ascorbic acid, erythorbic acid, etc. Of those, preferred are formic acid, acetic acid, nitric acid, hydrochloric acid and phosphoric acid, from the viewpoint that even a small amount of the acid can readily lower the pH of the coating liquid and from the viewpoint of the availability and the stability of the acid. The acid component satisfying the above-mentioned condition is effective for preventing alumina from aggregating and for prolonging the pot life of the coating liquid for use for forming the coating layer.

Preferably, the coating liquid for use in forming the coating layer in the present invention contains the acid component in an amount of from 10 ppm by mass to 10,000 ppm by mass. The content of the acid component is more preferably from 30 ppm by mass to 9,000 ppm by mass, even more preferably from 50 ppm by mass to 8,000 ppm by mass.

The content of 10 ppm by mass or more is preferred since it is effective for forming a coating film excellent in uniformity. The content of 10,000 ppm by mass or less is also preferred since it does not exhibit any negative influence on the performance of nonaqueous electrolyte secondary batteries.

(Formation Method for Coating Layer)

As the formation method for the coating layer in the multilayer porous film of the present invention, preferred from the viewpoint of continuous productivity is a coating and drying method that comprises coating the above-mentioned polyolefinic resin porous film with a coating liquid containing the above-mentioned metal components and a binder resin, more concretely, with the coating liquid of the present invention containing a slurry mentioned below and a resin binder, and then drying it.

In the case of forming a coating layer according to a coating and drying method, the solvent for the coating liquid is preferably a solvent capable of suitably uniformly and stably dissolving or dispersing the one or more metal components selected from water-insoluble metal oxides and metal salts and capable of suitably uniformly and stably dissolving or dispersing a resin binder.

As such a solvent, N-methylpyrrolidone, N,N-dimethylformamide, N,N-dimethylacetamide, water, dioxane, acetonitrile, lower alcohols, glycols, glycerin, lactates, etc. are exemplified. The lower alcohols include one or more selected from methanol, ethanol and isopropyl alcohol. In a case where water is used as the solvent in the present invention, the content of water in the solvent is, from the viewpoint of improving the viscosity stability of the coating liquid, preferably 50% by mass or more, more preferably 70% by mass or more, even more preferably 80% by mass or more, further more preferably 90% by mass or more.

Of those solvents, preferred is water or a mixed solvent of water and a lower alcohol from the viewpoint of the cost and the environmental load, and more preferred is a mixed solvent of water and isopropyl alcohol.

As a method of dispersing the above-mentioned one or more metal components selected from water-insoluble metal oxides and metal salts in the solvent, for example, there are mentioned a mechanical stirring method using a ball mill, a bead mill, a planetary ball mill, a shaking ball mill, a sand mill, a colloid mill, an attritor, a roll mill, a high-speed dispersion impeller, a disperser, a homogenizer, a high-speed impact mill, an ultrasonic disperser, a stirring blade or the like, etc.

In dispersing the metal components, the resin binder may also be dissolved or dispersed at the same time, but as compared with the storage of the coating liquid that contains the resin binder, the storage of a slurry in which the metal components have been dispersed in a solvent but which does not substantially contain a resin binder can be readily performed for a long period of time. Consequently, it is desirable to employ a method in which the slurry is first prepared, and then the resin binder is dissolved or dispersed in the slurry to prepare the coating liquid.

Specifically, the slurry of the present invention contains one or more metal components selected from the above-mentioned water-insoluble metal oxides and metal salts, and a solvent, wherein the content of water-soluble calcium contained in the metal components is 3 ppm by mass or less, and wherein, as measured using a single cylindrical rotatory viscometer (B-type viscometer) at a temperature of 23° C. and at a circumferential velocity of 100 rpm based on JIS Z8803 (2011), the ratio of the viscosity thereof $\eta_{72}$ in 72 hours after the production to the viscosity thereof $\eta_1$ in 1 hour after the production, $\eta_{72}/\eta_1$ is less than 10. Preferably, the slurry of the present invention contains one or more metal components selected from the above-mentioned water-insoluble metal oxides and metal salts as the main component therein.

The value $\eta_{72}/\eta_1$ is preferably less than 5, more preferably less than 3, even more preferably 2 or less. On the other hand, the value $\eta_{72}/\eta_1$ is preferably 0.1 or more, more preferably 0.2 or more, even more preferably 0.3 or more. It is considered that the ratio $\eta_{72}/\eta_1$ falling within the above range can realize excellent viscosity stability, that is, long-term storability of the slurry.

The upper limit of the viscosity of the slurry in 72 hours after the production, $\eta_{72}$, is preferably 6000 mPa·s or less, more preferably 5000 mPa·s or less, even more preferably 4500 mPa·s or less. On the other hand, the lower limit of $\eta_{72}$ is preferably 10 mPa·s or more, more preferably 15 mPa·s or more, even more preferably 20 mPa·s or more.

The value of $\eta_{72}$ falling within the above range is preferred in that, when the above-mentioned resin binder is dissolved or dispersed in the slurry that has been stored for a long period of time to prepare a coating liquid, it is easy to form the coating layer from the coating liquid for the multilayer porous film of the present invention and, in addition, the thus-produced multilayer porous film has excellent surface smoothness.

In dispersing the one or more metal components selected from the above-mentioned water-insoluble metal oxides and metal salts, and the above-mentioned resin binder in a solvent to prepare the coating liquid, a dispersion aid, a stabilizer, a thickener or the like may be added thereto before and after preparation of the coating liquid, for the purpose of improving the stability of the coating liquid and optimizing the viscosity thereof.

The step of applying the coating liquid onto the surface of the polyolefinic resin porous film is not specifically limited. Specifically, the coating liquid may be applied thereonto after extrusion and before stretching, or may be applied after the longitudinal stretching step or after the lateral stretching step in the process.

Not specifically limited, the coating mode in the coating step may be any one capable of realizing the necessary layer thickness and coating area. The coating method includes, for example, a bar coater method, a gravure coater method, a small-size gravure coater method, a reverse roll coater method, a transfer roll coater method, a kiss coater method, a dip coater method, a knife coater method, an air doctor coater method, a blade coater method, a rod coater method, a squeeze coater method, a cast coater method, a die coater method, a screen printing method, a spray coating method, etc. The coating liquid may be applied onto one surface alone or both surfaces of the polyolefinic resin porous film in accordance with the use thereof.

As the method for removing the solvent, any method is employable with no specific limitation thereon so far as the method does not have any negative influence on the polyolefinic resin porous film. As the method for removing the solvent, for example, there are mentioned a method of drying the polyolefinic resin porous film at a temperature not higher than the melting point thereof while the film is kept fixed, a method for drying the film at a low temperature and under reduced pressure, a method that comprises immersing the coated film in a poor solvent relative to the resin binder to thereby solidify the resin binder and, at the same time, extract out the solvent, etc.

<Shape and Physical Properties of Multilayer Porous Film>

The thickness of the multilayer porous film of the present invention is preferably from 5 to 100 μm, more preferably from 8 to 50 μm, even more preferably from 10 to 30 μm. In a case where the film is used as a separator for nonaqueous electrolyte secondary batteries, when the thickness of the film is 5 μm or more, the film can realize substantially necessary electric insulation performance, and in the case, for example, even when any large force is given to the projections of electrodes, the film used as the separator for nonaqueous electrolyte secondary batteries would not be broken through to bring about short-circuits, or that is, the battery having the film serving as the separator therein could be excellent in safety. In addition, the thickness of being 100 μm or less can reduce the electric resistance of the multilayer porous film, and therefore can sufficiently secure the battery performance.

The thickness of the coating layer is preferably 0.5 μm or more, more preferably 1 μm or more, even more preferably 2 μm or more, still more preferably 3 μm or more, from the viewpoint of the heat resistance of the film. On the other hand, from the viewpoint of the open cellular morphology thereof, the upper limit of the thickness of the coating layer is preferably 90 μm or less, more preferably 50 μm or less, even more preferably 30 μm or less, still more preferably 10 μm or less.

In the multilayer porous film of the present invention, the porosity is preferably 30% or more, more preferably 35% or more, even more preferably 40% or more. The multilayer porous film having a porosity of 30% or more could secure the open cellular morphology thereof and may be therefore excellent in vapor permeability characteristics.

On the other hand, the upper limit of the porosity is preferably 70% or less, more preferably 65% or less, even more preferably 60% or less. The multilayer porous film having a porosity of 70% or less could sufficiently secure the strength thereof, and the porosity range is preferred from the viewpoint of the handleability of the film.

The vapor permeability of the multilayer porous film of the present invention is preferably 1,000 sec/100 mL or less, more preferably from 10 to 800 sec/100 mL, even more preferably from 10 to 500 sec/100 mL. The multilayer porous film having a vapor permeability of 1,000 sec/100 mL or less means that the film realizes open cellular morphology and is excellent in vapor permeation performance.

The vapor permeability indicates the easiness of air passing through the film in the thickness direction of the film, and is concretely expressed as the time needed by 100 mL of air to pass through the film. Accordingly, air can pass more easily through the film having a smaller vapor permeability value, but could more hardly pass through the film having a larger vapor permeability value. In other words, the film having a smaller value means that the open cellular performance of the film in the thickness direction thereof is better, while the film having a larger value means that the open cellular performance of the film in the thickness direction thereof is worse. The open cellular performance indicates the degree of open cellular morphology of the film in the thickness direction thereof. The multilayer porous film of the present invention having a lower vapor permeability can be used in various applications. For example, in a case where the film is used as a separator for nonaqueous electrolyte secondary batteries, the low vapor permeability of the film means that lithium ions could more easily move in the film, and the property of the film is favorable as excellent in battery performance.

The vapor permeability of the multilayer porous film can be measured according to the method described in the section of Examples to be given below.

In use as a separator for nonaqueous electrolyte secondary batteries, the multilayer porous film of the present invention preferably has SD characteristics. Concretely, it is desirable that the vapor permeability of the film after heated at 135° C. for 5 seconds is 10,000 sec/100 mL or more, more preferably 25,000 sec/100 mL or more, even more preferably 50,000 sec/100 mL or more. The vapor permeability of the film after heated at 135° C. for 5 seconds of being 10,000 sec/100 mL or more realizes rapid closing of the open pores in the film in an emergency of abnormal heating to shut off current flowing, and therefore troubles of battery rupture and the like can be thereby evaded.

The shrinkage of the multilayer porous film of the present invention at 150° C. is preferably less than 10% in both the longitudinal direction and the lateral direction thereof, more preferably less than 9%, even more preferably less than 8%. The shrinkage at 150° C. of being less than 10% suggests that the film secures good dimensional stability even in abnormal heating over the SD temperature thereof and therefore has heat resistance. The film of the type can be prevented from being broken under heat and can therefore have an elevated internal short-circuiting temperature. Not specifically limited, the lower limit is more preferably 0% or more.

The shrinkage of the multilayer porous film may be measured according to the method described in the section of Examples to be given below.

The multilayer porous film of the present invention is excellent in the surface smoothness of the coating layer. The surface smoothness may be evaluated by the degree of roughness to be measured according to the method described below. The film having a smaller degree of roughness may be more excellent in smoothness.

The degree of roughness is preferably less than 100 projections/mm$^2$ from the viewpoint of evading film conveyance troubles and reducing appearance failures. More preferably, the degree of roughness is less than 80 projections/mm$^2$. Not specifically limited, the lower limit is ideally 0 projection/mm$^2$, but is, practically $10^{-10}$ projections/mm$^2$ or more.

[Separator for Nonaqueous Electrolyte Secondary Batteries, and Nonaqueous Electrolyte Secondary Battery]

Next described is a nonaqueous electrolyte secondary battery that houses the multilayer porous film of the present invention as a separator for nonaqueous electrolyte secondary batteries, with reference to FIG. 1. The separator for nonaqueous electrolyte secondary batteries of the present invention uses the multilayer porous film of the present invention, and the nonaqueous electrolyte secondary battery of the present invention uses the separator for nonaqueous electrolyte secondary batteries of the present invention.

Both electrodes of a positive electrode sheet 21 and a negative electrode sheet 22 are spirally wound up to be layered on each other via a battery separator 10 put therebetween, and the outer side thereof is fixed with a winding stopper tape to give a wound body.

The winding step is described in detail. One end of the battery separator is led to pass through the slit part of a pin, and the pin is rotated a little so that one end of the battery separator is wound around the pin. In this stage, the surface of the pin is kept in contact with the coating layer of the battery separator. Subsequently, a positive electrode and a negative electrode are so arranged as to sandwich the battery separator therebetween, and the pin is rotated with a winding tool so that the positive and negative electrodes and the battery separator are wound up. After the winding, the pin is drawn off from the wound body.

The wound body in which the positive electrode sheet 21, the battery separator 19 and the negative electrode sheet 22 have been integrally wound up is housed in a bottomed cylindrical battery case, and welded to positive electrode and negative electrode leads 24 and 25. Next, an electrolyte is injected into the battery can, and after the electrolyte has fully penetrated to the battery separator 10 and others, the opening of the battery can is sealed up with a positive electrode cap 27 fitted to the peripheral edge of the opening via a gasket 26. With that, the battery is pre-charged and aged to produce a cylindrical nonaqueous electrolyte secondary battery.

The electrolytic solution used here comprises a lithium salt as an electrolyte and is prepared by dissolving the electrolyte in an organic solvent. The organic solvent is not specifically limited. For example, as the organic solvent, there are mentioned esters such as propylene carbonate, ethylene carbonate, butylene carbonate, γ-butyrolactone, γ-valerolactone, dimethyl carbonate, methyl propionate, butyl acetate, etc.; nitriles such as acetonitrile, etc.; ethers such as 1,2-dimethoxyethane, 1,2-dimethoxymethane, dimethoxypropane, 1,3-dioxolan, tetrahydrofuran, 2-methyltetrahydrofuran, 4-methyl-1,3-dioxolane, etc.; sulfolanes, etc. One alone or two or more of these may be used here either singly or as combined. Above all, preferred is an electrolytic solution prepared by dissolving lithium hexafluorophosphate (LiPF$_6$) in a mixed solvent of 1 part by mass of ethylene carbonate and 2 parts by mass of methyl ethyl carbonate, in an amount of 1.0 mol/L of the electrolyte in the solvent.

As the negative electrode, usable here is one produced by integrating an alkali metal or alkaline metal-containing compound with a current-collecting material such as stainless steel-made net or the like. The alkali metal includes, for example, lithium, sodium, potassium, etc. The alkali metal-containing compound includes, for example, alloys of an alkali metal with aluminum, lead, indium, potassium, cadmium, tin, magnesium or the like; compounds of an alkali metal and a carbon material; compounds of a low-potential alkali metal and a metal oxide or sulfide, etc. In case where a carbon material is used as the negative electrode, the carbon material may be any one capable of being doped and dedoped with a lithium ion. For example, employable here are graphite, thermal cracked carbons, cokes, glassy carbons, fired bodies of organic polymer compounds, mesocarbon microbeads, carbon fibers, active carbons, etc.

The active material usable here for the positive electrode includes metal oxides such as lithium cobalt oxide, lithium nickel oxide, lithium manganese oxide, manganese dioxide, vanadium pentoxide, chromium oxide, etc.; metal sulfides such as molybdenum disulfide, etc. A mixture prepared by suitably adding a conductive assistant or a binder such as polytetrafluoroethylene or the like to the positive electrode active material is shaped into a shaped body with a core of a current-collecting material such as stainless steel-made net or the like, and the thus-shaped body is used.

EXAMPLES

With reference to Examples and Comparative Examples given hereinunder, the multilayer porous film of the present invention is described concretely. However, the present invention is not limited to these. The lengthwise direction of the multilayer porous film is referred to as "longitudinal direction" and the direction vertical to the lengthwise direction is referred to as "lateral direction".

<Measurement Methods and Evaluation Methods>

(1) Water-Soluble Calcium Content in Metal Component 7 g of alumina used in Examples and Comparative Examples was put into a 50-mL measuring flask, and diluted with ultrapure water to be 50 mL in total therein.

Subsequently, using an ultrasonic washer, this was eluted for 6 hours, and then statically left as such for one day for immersion. A supernatant of the resultant aqueous solution was centrifuged for 1 hour at a rotating speed of 11400 rpm, using a centrifuge (3-18K, manufactured by SIGMA CORPORATION), and then the amount of the calcium element contained in the supernatant was measured using an inductively-coupled plasma mass spectrometer (ICP-MS). In these Examples and Comparative Examples, the content of water-soluble calcium contained in the metal component for use in the coating liquid was measured, but the content of water-soluble calcium to be determined by this measurement can be considered to be the same as the content of water-soluble calcium in the metal component that is measured in the formed coating layer.

(2) Viscosity of Slurry

With respect to each slurry prepared in Examples and Comparative Examples, the slurry is statically left for 1 hour or 72 hours after the preparation thereof, and subsequently the viscosity thereof at a temperature of 23° C. was measured according to JIS Z8803 (2011), using a B-type viscometer (TVB10H, manufactured by Toki Sangyo Co., Ltd.) at a peripheral speed of 100 rpm to thereby obtain $\eta_1$ and $\eta_{72}$, respectively.

(3) Stability of Slurry

The stability of the slurry prepared in each Example and Comparative Example was evaluated as follow.

G (good): The value of $\eta_{72}/\eta_1$ was less than 10.

B (bad): The value of $\eta_{72}/\eta_1$ was 10 or more.

(4) Degree of Roughness and Surface Smoothness

Using a microstructure analyzer (ET4000A, manufactured by Kosaka Laboratory Ltd.), the surface on the coating layer side of the multilayer porous film was inspected in a viewing field of 300 μm×400 μm thereof, and the number of projections protruding from the periphery by 5 μm or more therein was counted, and converted into the number thereof per 1 mm². The analyzed sample was evaluated according to the criteria mentioned below.

G (good): The degree of roughness was less than 100 projections/mm².

B (bad): The degree of roughness was 100 projections/mm² or more.

(5) Total Thickness

For the total thickness, unspecified 5 points in the plane of the multilayer porous film were measured using a 1/1000 mm dial gauge, and the found data were averaged to give a mean value thereof.

(6) Thickness of Coating Layer

The thickness of the coating layer was calculated as the difference between the total thickness of the multilayer porous film and the thickness of the polyolefinic resin porous film.

(7) Vapor Permeability Degree (Gurley Value)

The vapor permeability degree was measured according to JIS P8117 (2009).

(8) Shrinkage at 150° C.

First, the multilayer porous film produced in each of Examples and Comparative Examples was cut out to have a size of 150 mm in length×10 mm in width, and was given two point marks at an interval of 100 mm in the lengthwise direction to prepare a sample. Next, the sample was put into an oven ("Tabai Gear Oven GPH200", manufactured by Tabai Espec Co., Ltd.) set at 150° C. and statically left therein for 1 hour. The sample was taken out of the oven and cooled, and then the length (mm) between the two point marks was measured, and the shrinkage of the film was calculated according to the following equation.

Shrinkage (%)={(100−length after heating)/100}×100

The above measurement was carried out both in the longitudinal direction and in the lateral direction of the multilayer porous film.

(9) Heat Resistance

The heat resistance was evaluated according to the evaluation criteria mentioned below.

G (good): The shrinkage at 150° C. for 1 hour was less than 10% both in the longitudinal direction and in the lateral direction.

B (bad): The shrinkage at 150° C. for 1 hour was 10% or more in any of the longitudinal direction or the lateral direction.

(Polyolefinic Resin Porous Film)

A polypropylenic resin ("Novatec PP FY6HA" manufactured by Japan Polypropylene Corporation, density: 0.90 g/cm³, MFR: 2.4 g/10 min, Mw/Mn: 3.22), and a β-crystal nucleating agent 3,9-bis [4-(N-cyclohexylcarbamoyl)phenyl]-2,4,8,10-tetroxaspiro [5.5]undecane were prepared. These materials were blended in such a ratio that the amount of the β-crystal nucleating agent could be 0.2 parts by mass relative to 100 parts by mass of the polypropylenic resin, and put into a co-rotating twin-screw extruder (diameter: 40 mmφ, L/D: 32) manufactured by Toshiba Machine Co., Ltd., and melt-kneaded therein at a preset temperature of 300° C.

Subsequently, the strands were cooled and solidified in a water bath and cut with a pelletizer into pellets of the polypropylenic resin.

The pellets were extruded out through a nozzle, and cooled and solidified on a casting roll at 127° C. to form a film.

The film was stretched by 4.6 times in the longitudinal direction at 105° C., using a longitudinal stretcher, and thereafter stretched by 2.1 times in the lateral direction at 150° C., using a lateral stretcher, and then thermally fixed at 153° C. Subsequently, this was relaxed, and then, using a generator CP1 manufactured by VETAPHONE Co., Ltd., this was processed for corona surface treatment at an output of 0.4 kW and at a speed of 10 m/min to give a polyolefinic resin porous film.

Example 1

52.6 parts by mass of alumina (water-soluble calcium concentration: 1.44 ppm by mass, mean particle size: 0.5 μm), 5.3 parts by mass of isopropyl alcohol and 42.1 parts by mass of ion-exchanged water were mixed and processed in a bead mill to give an alumina slurry. The conditions of the bead mill used here are as follows.

Device: "NVM-1.5" manufactured by AIMEX Corporation
Beads: made of ϕ0.5 mm zirconia, filling rate 85%
Peripheral speed: 10 m/sec
Discharge rate: 350 mL/min The resultant alumina slurry was statically kept for 1 week, and then 61.8 parts by mass of the alumina slurry, 9.9 parts by mass of an aqueous solution of 5 mass % polyvinyl alcohol ("PVA-124" manufactured by Kuraray Co., Ltd.) and 28.3 parts by mass of ion-exchanged water were mixed, and hydrochloric acid was added thereto so that the acid could be 70 ppm by mass relative to the total amount of the slurry to give a coating liquid having a solid concentration of 33% by mass.

The resultant coating liquid was applied onto the polyolefinic resin porous film, using a gravure roll (lattice pattern, number of lines: 25 lines/inch, depth: 290 μm, cell capacity 145 mL/m$^2$), then dried in a drying furnace at 45° C.

The resultant multilayer porous film was evaluated for the physical properties thereof, and the results were collected in Table 1.

Example 2

A multilayer porous film was produced in the same manner as in Example 1 except that the alumina used in Example 1 was changed to a different alumina (water-soluble calcium content: 2.00 ppm by mass, mean particle size: 0.5 μm).

The resultant multilayer porous film was evaluated for the physical properties thereof, and the results were collected in Table 1.

Comparative Example 1

A multilayer porous film was produced in the same manner as in Example 1 except that the alumina used in Example 1 was changed to a different alumina (water-soluble calcium content: 5.79 ppm by mass, mean particle size: 0.5 μm).

The resultant multilayer porous film was evaluated for the physical properties thereof, and the results were collected in Table 1.

Comparative Example 2

A multilayer porous film was produced in the same manner as in Example 1 except that the alumina used in Example 1 was changed to a different alumina (water-soluble calcium content: 7.26 ppm by mass, mean particle size: 0.5 μm).

The resultant multilayer porous film was evaluated for the physical properties thereof, and the results were collected in Table 1.

Comparative Example 3

The polyolefinic resin porous film alone, that is, without being coated with a coating layer, was evaluated for the physical properties, and the results were collected in Table 1.

TABLE 1

|  | Example | | Comparative Example | | |
| --- | --- | --- | --- | --- | --- |
|  | 1 | 2 | 1 | 2 | 3 |
| Amount of Water-Soluble Calcium [ppm by mass] | 1.44 | 2.00 | 5.79 | 7.26 | — |
| Viscosity ($\eta_1$) [mPa·s] | 4700 | 1130 | 36 | 45 | — |
| Viscosity ($\eta_{72}$) [mPa·s] | 4460 | 1200 | >60000 | >60000 | — |
| $\eta_{72}/\eta_1$ | 0.95 | 1.06 | >1667 | >1667 | — |
| Stability of Slurry | G | G | B | B | — |
| Degree of Roughness [projections/mm$^2$] | <100 | <100 | 333 | 333 | — |
| Surface Smoothness | G | G | B | B | — |
| Total Thickness [μm] | 24 | 24 | 25 | 25 | 20 |
| Thickness of Coating Layer [μm] | 4 | 4 | 5 | 5 | 0 |
| Vapor Permeability [sec/100 mL] | 190 | 192 | 197 | 191 | 157 |
| Shrinkage at 150° C. longitudinal direction | 4 | 4 | 4 | 5 | 13 |
| Shrinkage at 150° C. lateral direction | 5 | 5 | 5 | 4 | 12 |
| Heat Resistance | G | G | G | G | B |

As obvious from Table 1, the alumina slurries prepared in Examples have high viscosity stability and therefore, when used as a coating liquid, the slurries gave multilayer porous films excellent in surface smoothness.

On the other hand, the multilayer porous films produced in Comparative Examples 1 and 2 had poor surface smoothness as compared with those in Examples since the viscosity stability of the alumina slurries used was poor.

Since the polyolefinic resin porous film in Comparative Example 3 was not coated with a coating layer, the heat resistance of the film was insufficient.

The multilayer porous film of the present invention can be used in various applications that require vapor permeability characteristics. Concretely, the film can be extremely favorably used as materials for separators for lithium ion secondary batteries; pads for body fluid absorption such as disposable diapers, sanitary goods, etc., hygiene materials such as bed sheets, etc.; medical supply materials such as surgical gowns, hot pack substrates, etc.; clothing materials such as jackets, sportswear, rainwear, etc.; building materials such as wallpapers, roof waterproofing materials, heat insulating materials, acoustic absorbent materials, etc.; desiccants; moistureproof agents; deoxidants; disposable pocket warmers; wrapping and packaging materials for freshness-keeping wrapping or packaging, food wrapping or packaging, etc.

REFERENCE SIGNS LIST

10 Separator for Nonaqueous Electrolyte Secondary Batteries
20 Secondary Battery
21 Positive Electrode Sheet
22 Negative Electrode Sheet
24 Positive Electrode Lead
25 Negative Electrode Lead
26 Gasket
27 Positive Electrode Cap

The invention claimed is:

1. A slurry comprising one or more metal components selected from water-insoluble metal oxides and metal salts, and a solvent, wherein the content of water-soluble calcium contained in the metal components is 3 ppm by mass or less, and wherein, as measured using a single cylindrical rotatory viscometer at a temperature of 23° C. and at a circumferential velocity of 100 rpm, the ratio of the viscosity thereof $\eta_{72}$ in 72 hours after the production to the viscosity thereof $\eta_1$ in 1 hour after the production, $\eta_{72}/\eta_1$, is less than 10.

2. The slurry according to claim 1, wherein the metal component is one or more selected from alumina, barium sulfate and barium titanate.

3. A coating liquid comprising the slurry of claim 1 and a resin binder.

4. The coating liquid according to claim 3, wherein the water content in the solvent is 50% by mass or more.

5. The slurry according to claim 1, wherein the content of water-soluble calcium contained in the metal components is 0.1 ppm by mass or more.

6. The coating liquid according to claim 3, wherein the solvent is a mixed solvent of water and isopropyl alcohol.

7. The slurry according to claim 1, wherein the viscosity thereof in 72 hours after the production, $\eta_{72}$, is 10 mPa or more and 6000 mPa or less.

* * * * *